United States Patent [19]

Hofstetter

[11] 4,236,817
[45] Dec. 2, 1980

[54] PHOTOGRAPHIC COPYING MACHINE WITH EXCHANGEABLE FORMAT MASKS

[75] Inventor: Franz Hofstetter, Hebertshausen, Fed. Rep. of Germany

[73] Assignee: AGFA-Gevaert AG, Leverkusen, Fed. Rep. of Germany

[21] Appl. No.: 61,308

[22] Filed: Jul. 27, 1979

[30] Foreign Application Priority Data

Jul. 29, 1978 [DE] Fed. Rep. of Germany ....... 2833423

[51] Int. Cl.³ .............................................. G03B 27/72
[52] U.S. Cl. ........................................ 355/68; 355/71; 355/74
[58] Field of Search .................... 355/35–38, 355/67–71, 74, 83, 88, 41

[56] References Cited

U.S. PATENT DOCUMENTS

| 3,488,119 | 1/1970 | Dixon et al. | 355/74 |
| 3,888,580 | 6/1975 | Amano et al. | 355/38 |

*Primary Examiner*—George H. Miller, Jr.
*Assistant Examiner*—W. J. Brady
*Attorney, Agent, or Firm*—Michael J. Striker

[57] ABSTRACT

When the size of the frame of a format mask is changed, an automatic frame-area measurement is performed, so that the exposure-duration control system of the copying machine be informed of the size of the format-mask frame to be employed. The machine is provided with photo-detectors which receive light through a transparent original for exposure-duration control purposes. At least one photodetector is used for the format-size measurement, the photodetector signal being transmitted through a controllable-gain amplifier to the exposure-duration control circuit. When an automatic frame-area measurement is commanded, all filters and shutter elements move out of the copying-light path and a calibration filter moves in so that the light incident on the photodetector does not greatly exceed that transmitted by a typical original. With no original to be copied present, but only the calibration filter, a counter stepwise varies the gain of the controllable-gain amplifier until the output signal of the latter reaches a predetermined value, whereupon the counter is arrested and the thusly established gain maintained during subsequent normal exposure-duration control performed during actual copying of originals.

9 Claims, 2 Drawing Figures

PHOTOGRAPHIC COPYING MACHINE WITH EXCHANGEABLE FORMAT MASKS

BACKGROUND OF THE INVENTION

The present invention concerns photographic copying or printing machines of the type provided with a carrier or support for originals to be copied (e.g., negatives to be printed), the carrier being provided with an exchangeable format mask for different formats of originals to be copied, a variable objective being provided to image the original onto the copy-medium plane, and the copying machine being provided with an automatic exposure control system which automatically sets the exposure time to be implemented for different constituent colors in dependence upon the at least one photodetector receiving light transmitted through the oringinal.

Photographic copying machines are often provided with exchangeable format masks to accommodate negatives of differing dimensions and/or to frame sections of negatives to be copied for differing enlargement of such sections. It is of course also known to provide such copying machines with automatic exposure control systems comprising photodetectors which generate signals dependent upon the density and/or color balance of the originals and means automatically setting the intervals of exposure time which are to be allotted for the component colors involved.

For machines provided with automatic exposure control and exchangeable format masks, the size of the negative or format-mask aperture involved is an important parameter for the automatic exposure control system of the machine.

For example, in Federal Republic of Germany Pat. No. 1,209,871, each format mask is provided with markings identifying the size of the mask aperture, these markings being provided in the form of depressions or apertures sensed by the pins of spring-contact switches, to inform the exposure control system of the machine what negative size will be involved. Federal Republic of Germany published patent application (Offenlegungsschrift) 26 59 449 discloses providing each format mask with magnetic elements which is coded form indicate the respective format size. These magnetic elements control magnetically responsive switching elements such as reed contacts, Hall elements, or the like.

The disadvantage of such prior-art approaches is that when a large number of different format masks are involved it is necessary that a sizable encoding capacity be provided, which in turn requires a correspondingly large number of code-reading and code-representing elements, such as the aforementioned Hall elements, spring-contact switches, or whatever. In addition, appropriate decoding circuitry must be provided.

SUMMARY OF THE INVENTION

Accordingly, it is a general object of the invention to provide a photographic copying machine of the type discussed above in which no resort need be taken to any kind of encoding scheme such as employed in prior art.

In accordance with the present invention, when a new format mask is to be used, the size of the format-mask aperture is ascertained by measurement of radiation transmitted by the tank. The resultant signal is then used to inform the automatic exposure control system of the machine what size image is being copied.

Such copying machines will typically be provided, anyway, with one or more photodetectors operative for receiving light transmitted by that portion of the original to be copied which is framed by the format mask. Such photodetectors may be employed to evaluate the density and/or the color balance of the image to be copied. It is a further concept of the invention to use one of these anyway provided photodetectors to initially measure the light transmitted by the format mask and in that way ascertain the size of the formatmask aperture. In this way, additional photodetectors need not be employed.

Especially when the size of the format-mask aperture is to be photometrically ascertained using one of the photodetectors anyway provided on such machine, it is advantageous not to expose such photodetector through unattenuated light transmitted through the format-mask aperture, but instead to insert into the path of the light employed a calibration filter having a transmission value corresponding to the density of an average or typical original. In this way, when the anyway present photodetector is borrowed for photometric ascertainment of mask-aperture size, the light incident upon it will not too extremely differ from the light to which it would be exposed during its normal use.

Advantageously, the circuitry employed is made responsive to a change of format-mask aperture area, and in response to such change the photometrically ascertained aperture area is memorized by a signal-storing device, and continually referred to by the automatic exposure control system until the next change of format-mask aperture area.

In this way, the automatic exposure control action is made correctly dependent upon format-mask aperture area, but without resort to complex area-identifying encoding schemes such as discussed above. Besides the eleimination of decoding circuitry and elimination of the need to encode all format masks employed, the format masks themselves can be of simpler construction. Indeed, it becomes very appropriate when the present invention is used not to employ exchangeable format masks alone but instead to provide format masks of adjustable aperture, having adjustable aperture height and aperture width.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
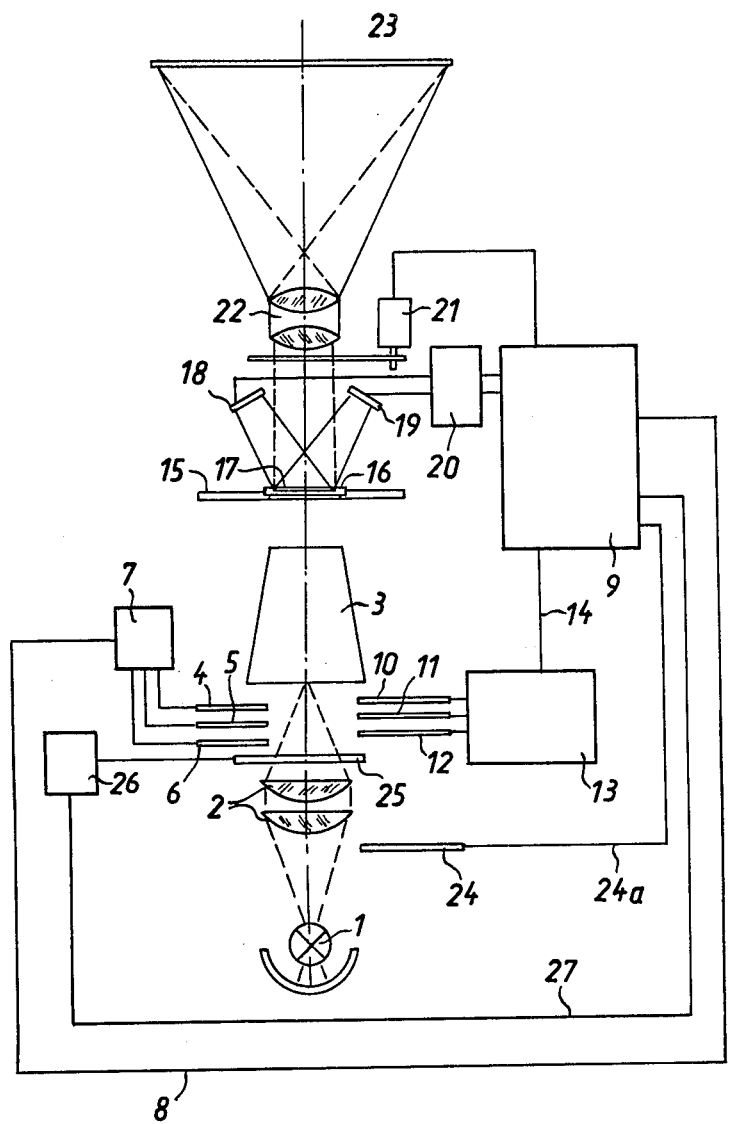
FIG. 1 is a schematic depiction of an exemplary photographic copying machine in accordance with the invention.

In FIG. 1, numeral 1 denotes a light source whose emitted light is projected by a double condensor lens system 2 or else directly into a light mixing chute 3. Located in front of light mixing chute 3 is a set of complementary-color color bias filters 4, 5, 6 which can be shifted into the light path to varying degrees to establish a source-light color balance matched to the color sensitivities of whatever copying medium is being employed. The color bias filters 4, 5, 6 are individually shiftable by means of a drive unit 7 which is activated via a control line 8 by the automatic exposure control system 9 of the copying machine. Likewise arranged in front of light mixing chute 3 is a set of color filters 10, 11, 12, individually shiftable into the light path by means of a respective drive unit 3 which receives control signals via a control line 14 from automatic exposure control system 9. In particular, these color filters 10, 11, 12 are shifted into the light path at those times at which exposure in respective ones of the constituent complementary colors involved is to terminate.

Located behind light mixing chute 3 is the support 15 for originals to be printed. A format mask 16 is inserted into original support 15 and has a frame aperture 17 for an original to be masked. Located behind the support 15 and the format mask 16 are photodetectors, here two photodetectors 18 and 19 shown, with which the copying machine is anyway provided for transmission of signals to the automatic exposure control system 9 of the machine. The illustrated machine is additionally provided with a format compensating circuit 20 (depicted in detail in FIG. 2) which receives the signal from at least one of the photodetectors. Each photodetector is made selectively responsive to a respective spectral range by provision of a respective color filter, and the photodetectors are positioned outside the beam path proper but within the field of scattered beam light. The format compensating circuit 20 is connected to the automatic exposure control system 9 of the machine, to inform it of the format-mask aperture area involved. Located behind the photodetectors 18, 19 is an electromagnetically activated shutter 21, behind which is arranged a variable objective 22 which projects a sharp image of the original into the plane 23 in which copying medium is located. Copying medium may be present, for example, in the form of a roll of printing paper transported past the exposure position in automatic response to each exposure operation performed. A heat shutter 24 is provided just after the light source 1 and can be shifted into the light path by a control signal furnished on control line 24a. Heat shutter 24, when in the light path, absorbs about 90% of the copying light employed.

A dichroic calibration filter 25 is located between the heat shutter 24 and the light mixing chute 3, and is shifted into and out of the beam path by a respective drive unit 26 controlled by signals transmitted via a control line 27 from automatic exposure control system 9. Calibration filter 25 is shifted into the beam path when a new format-mask aperture area is involved and the compensation of the exposure control system 9 is therefore to be redone. The calibration filter 25 has light-transmissive characteristics which simulate those of an average or typical negative, so that the light incident on the photodetectors during a mask-area determination not too greatly differ from the light incident during normal exposure-control action.

Figure 2:
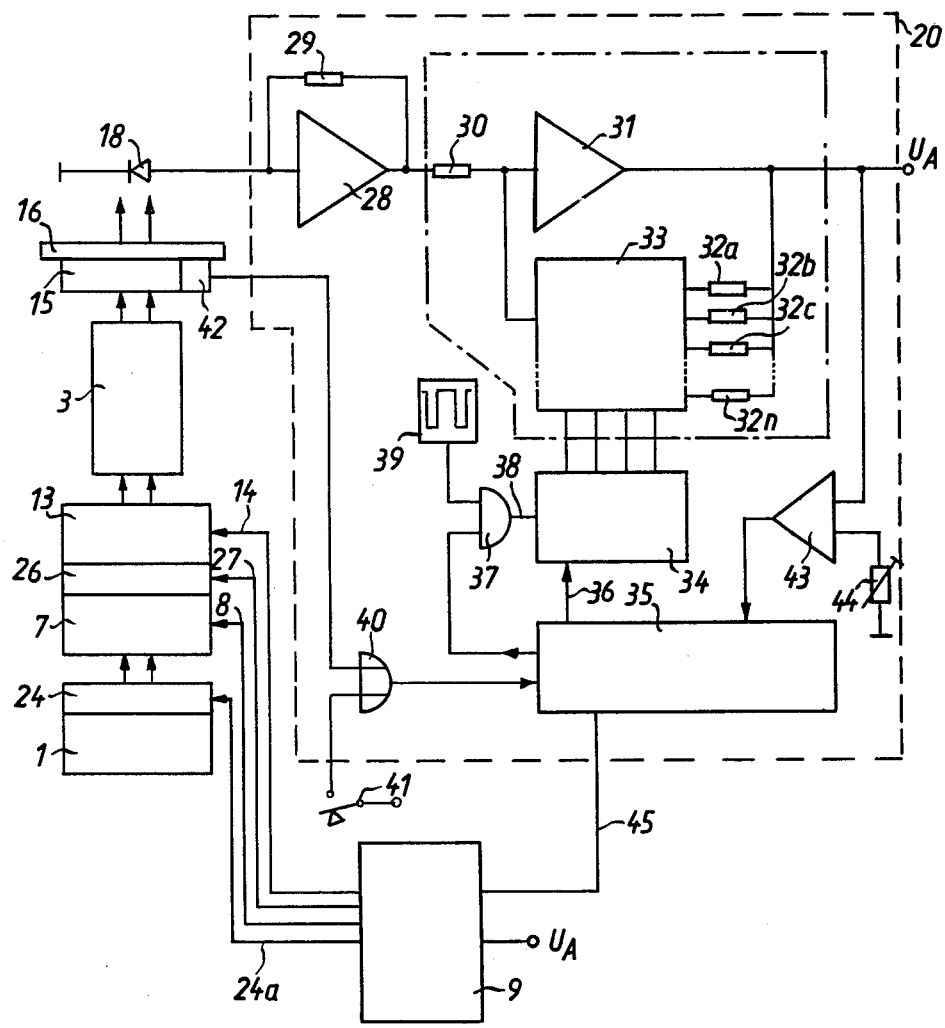
FIG. 2 is a circuit diagram of the format-compensating circuitry employed in FIG. 1, including components cooperating with such circuitry.

FIG. 2 depicts the internal configuration of format compensating circuit 20 of FIG. 1, as well as its interconnections with components in FIG. 1 with which it cooperates. The format compensating circuit 20 is here depicted with respect to cooperation with one photodetector 18. The photocurrent produced by photodiode 18 is applied to a current-to-voltage converter comprised of an amplifier 28 with a negative-feedback resistor 29. The output of amplifier 28 is connected via a resistor 30 of the input a controllable-gain, inverting amplifier shown enclosed in dash-dot lines and comprised of an amplifier 31 at whose output there is produced the operating voltage $U_A$ for the conventional exposure-light integrator with which automatic exposure control system 9 is provided. The output of amplifier 31 is fed back to its input via selected ones of a set of negative-feedback resistors $32a$, $32b$, $32c$, ..., $32n$, one terminal of each resistor being connected to the output of amplifier 31. The other terminal of each resistor is connected to a respective input of an n-bit multiplexer 33. The output of multiplexer 33 is connected to the inverting input of amplifier 31. Components 30–33 in conjunction form a so-called multiplying digital-to-analog converter. Multiplexer 33 has n control inputs connected to the outputs of an n-bit counter 34. Counter 34 counts pulses furnished to it via a line 38, and can be reset by a reset signal fed to it via a line 36. Reset line 36 is connected to one output of an electronic switching stage 35. Counting input line 38 is connected to the output of an AND-gate 37 whose lower input is connected to another output of switching stage 35, and whose upper input is connected to the output of a pulse generator 39. Switching stage 35 has a start input connected to the output of an OR-gate 40. The lower input of OR-gate 40 is connected to a manually activated momentary switch 41. The upper input of OR-gate 40 is connected to a sensor 42 provided at the support 15 and operative for producing a signal when a new format mask 16 has been laid into support 15. In FIG. 2 there is also depicted, in addition to the light mixing chute 3, the various drive units for the exposure filters (at 13) for the calibration filter (at 26), for the color bits filters (at 7), as well as the heat shutter 24 and the light source 1. These drive units are, as already stated with regard to FIG. 1, connected to the automatic exposure control system 9 of the machine via respective control lines 14, 27, 8 and 24a.

The format compensating circuit 20 furthermore includes a comparator 43 having a first input connected to receive voltage $U_A$ and having a second input connected to receive a reference voltage from a factory-adjusted reference potentiometer 44. The output of comparator 43 is connected to a further input of the electronic switching stage 35, this input constituting a stop input to which a stop signal is furnished by comparator 43 when the magnitude of operating voltage $U_A$ has reached the magnitude of the reference voltage; this stop signal is used to stop counter 34.

The embodiment depicted in FIGS. 1 and 2 operates as follows:

When a new format mask is laid into support 15, sensor 42 generates a signal which via the OR-gate 40 is applied to the start input of the electronic switching stage 35. Alternatively, this start signal could be applied in response to closing of manually operated momentary switch 41, for example if a set of exchangeable format masks is not employed but instead one format mask of adjustable aperture height and aperture width.

The application of this start signal to electronic switching stage 35 initiates several functions. Stage 35 furnishes via line 45 a signal to automatic exposure control system 9, in response to which the latter commands that the lamp shutter 24, the bias filters 4, 5, 6, and the exposure filters 10, 11, 12 be moved out of the light path, and the calibration filter 25 be moved in. Via line 36 stage 35 applies a reset signal to the n-bit counter 34, causing the latter to reset. Likewise in response to the start signal, but after the elapse of a time delay of about 120 ms, stage 35 applies a "1" signal to the lower input of AND-gate 37, enabling the latter to transmit pulses from pulse generator 39 for counting by counter 34. This time delay is provided to assure that the components moved out of and into the light path have had time enough to finish their movements. Upon elapse of this time delay, the photoelement or elements employed will have developed steady responses to incident light.

Meanwhile, photodetector 18 has been exposed to stray light transmitted through format mask 16 in the absence of an original to be copied but with the calibration filter 25 located in the light path and serving to simulate an original of average or typical density. The photocurrent produced by photodiode 18 is proportional to the light-transmissive surface area of the format-mask aperture, the light per unit surface area being constant. The photocurrent produced by photodiode 18 is converted into a corresponding voltage by amplifier 28 and amplified by controllable-gain amplifier 30–33. As counter 34 progressively counts, different ones of resistors 32a, 32b, 32c, . . . , 32n are switched in as the feedback resistors for controllable-gain amplifier 30–33, so as to progressively alter the gain of this amplifier and thereby progressively vary the output voltage $U_A$. When output voltage $U_A$ has reached the reference voltage established by stage 44, comparator 43 applies a stop signal to electronic switching stage 35, the latter disables the AND-gate 37, and as a result the progressive advancement of the count on n-bit counter 34 ceases at whatever count has most recently been reached. Simultaneously, switching stage 35 transmits via line 45 a signal to exposure control system 9 informing the latter that the format compensation has been completed and that the lamp shutter, the bias filters and the color filters can be moved back into the light path, and that the calibration filter 25 is to be moved back out of the light path. Now an original can be laid into the format mask 16, or otherwise positioned for exposure. Non-illustrated means are then employed to initiate an actual copying or printing exposure. The output voltage $U_A$ of format compensating circuit 20 is now used as an amplified version of the photocurrent produced by photodiode 18, i.e., for ordinary exposure-control purposes. However, the gain to which controllable-gain amplifier 30–33 has now meanwhile been set persists during exposure-control operations, and is applied to the correspondingly denoted terminal of exposure control system 9 to control the charging of the exposure timing capacitor or capacitors within system 9.

In FIG. 2, only a single one of the photodetectors has been shown with respect to the automatic gain adjustment of its associated controllable-gain amplifier. However, it will be clear that each further such photodetector present can, for example, likewise be provided with a respective controllable-gain amplifier whose gain is automatically adjusted in dependence upon format-mask aperture size in the same manner as described above with regard to FIG. 2.

It will be understood that each of the elements described above, or two or more together, may also find a useful application in other types of circuits and constructions differing from the types described above.

While the invention has been illustrated and described as embodied in a particularly preferred embodiment, in which, for example, photometric ascertainment of format-mask aperture area is performed using one of the photodetectors with which the copying machine is already provided, and so forth, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

1. An improved photographic copying machine of the type provided with means for positioning an original to be copied including format mask means for establishing a variable-area format-mask frame for originals to be copied, exposure means for exposing the original to be copied to copying light, variable projection means for projecting a copying-light image of the original into a predetermined plane where copying medium is to be situated, and exposure-duration control means operative for automatically implementing the exposure duration of the original and copying medium, the improvement comprising frame-area measuring means operative for ascertaining the size of the variable format-mask frame and modifying the operation of the exposure-duration control means in dependence thereon by photometrically evaluating light transmitted through the format-mask frame in the absence of an original to be copied.

2. A copying machine as defined in claim 1, the copying machine being of the type provided with at least one photosensitive means located to receive light transmitted through an original to be copied and furnishing in dependence upon the received light a signal to the exposure-duration control means indicating the value of an optical characteristic of the original, the frame-area measuring means including a controllable-gain amplifier amplifying the signal produced by the photosensitive means, and gain-control means operative in the absence of an original to be copied for changing the gain of the controllable-gain amplifier until the amplified signal produced by the photosensitive means reaches a predetermined value and thereafter maintaining that gain during exposure of originals to be copied.

3. A copying machine as defined in claim 2, furthermore including a calibration filter intended to simulate the characteristics of an average or typical original, and means operative for moving the calibration filter into the path of copying light when a photometric measurement of format-mask frame area is to be performed.

4. A copying machine as defined in claim 2, the controllable-gain amplifier and gain-control means comprising an amplifier having an inverting input connected to receive the signal produced by the photosensitive means and having an output connected to the exposure-duration control means, an n-bit multiplexer having inputs connected to first terminals of a set of negative-feedback resistors, the other terminals of the negative-feedback resistors being connected to the output of the amplifier, the multiplexer having an output connected to the inverting input of the amplifier, and means for controlling the multiplexer.

5. A copying machine as defined in claim 4, the means controlling the n-bit multiplexer comprising an n-bit counter and means applying to the counter pulses to be counted.

6. A copying machine as defined in claim 5, the frame-area measuring means furthermore including a comparator receiving the output signal of the amplifier and operative for causing the counting performed by the counter to be arrested with the amplified signal produced by the photosensitive means reaches the predetermined value.

7. A copying machine as defined in claim 1, the machine being provided with a support supporting a removable format mask, the frame-area measuring means furthermore including a sensor responsive to mere physical placement of a format mask on the support by generating a signal commanding that a frame-area measurement be performed.

8. A copying machine as defined in claim 7, furthermore including manually operated means for commanding that a frame-area measurement be performed.

9. A copying machine as defined in claim 1, furthermore including manually operated means for commanding that a frame-area measurement be performed.

* * * * *